(12) United States Patent
Bonk et al.

(10) Patent No.: US 9,108,540 B2
(45) Date of Patent: Aug. 18, 2015

(54) POWER FOLD WITH LOCK FOR VEHICLE SEAT (75) Inventors: Jeffery Bonk, Chesterfield, MI (US); Miroslav Tasevski, Rochester Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 260 days.

(21) Appl. No.: 13/563,035

(22) Filed: Jul. 31, 2012

(65) Prior Publication Data

US 2013/0193735 A1 Aug. 1, 2013

Related U.S. Application Data (60) Provisional application No. 61/513,967, filed on Aug. 1, 2011.

(51) Int. Cl.
*B60N 2/02* (2006.01)
*B60N 2/20* (2006.01)
*B60N 2/22* (2006.01)
*B60N 2/225* (2006.01)
*B60N 2/28* (2006.01)
*B60N 2/36* (2006.01)

(52) U.S. Cl.
CPC .............. *B60N 2/206* (2013.01); *B60N 2/0232* (2013.01); *B60N 2/0244* (2013.01); *B60N 2/20* (2013.01); *B60N 2/22* (2013.01); *B60N 2/225* (2013.01); *B60N 2/2213* (2013.01); *B60N 2/2851* (2013.01); *B60N 2/36* (2013.01); *B60N 2/366* (2013.01); *B60N 2205/50* (2013.01)

(58) Field of Classification Search
CPC .................................. B60N 2/206; B60N 2/20
USPC ............................. 297/378.12, 378.14, 378.1
See application file for complete search history.

(56) References Cited

U.S. PATENT DOCUMENTS

| | | | | |
|---|---|---|---|---|
| 7,578,556 B2 * | 8/2009 | Ohba et al. | ..................... | 297/366 |
| 8,231,176 B2 * | 7/2012 | Mitsuhashi | ............... | 297/367 R |
| 8,544,956 B2 * | 10/2013 | Park et al. | ..................... | 297/326 |
| 8,690,251 B2 * | 4/2014 | Miller et al. | ............. | 297/378.12 |
| 2004/0195892 A1 * | 10/2004 | Daniels | ...................... | 297/378.1 |
| 2009/0096270 A1 * | 4/2009 | Halbig et al. | ............. | 297/378.12 |
| 2010/0123343 A1 * | 5/2010 | Bonk et al. | ............. | 297/378.12 |
| 2012/0062012 A1 * | 3/2012 | Miller et al. | ............. | 297/378.12 |
| 2014/0138999 A1 * | 5/2014 | Stesl et al. | ............... | 297/378.12 |

* cited by examiner

*Primary Examiner* — Rodney B White
*Assistant Examiner* — Alexander Harrison
(74) *Attorney, Agent, or Firm* — Reising Ethington P.C.

(57) ABSTRACT

A vehicle seat includes a seat base and a seat back coupled to the seat base. The seat back moves about a seat-back pivot axis from an upright position to a fold-flat position.

16 Claims, 8 Drawing Sheets

POWER FOLD WITH LOCK FOR VEHICLE SEAT

PRIORITY

This application claims priority under 35 U.S.C. §119(e) to U.S. Provisional Application Ser. No. 61/513,967, filed Aug. 1, 2011, which is expressly incorporated by reference herein.

BACKGROUND

The present disclosure relates to vehicle seats, and particularly to lock mechanisms for foldable vehicle seats. More particularly, the present disclosure relates to seat-back lock mechanisms for powered vehicle backrests, for an easy entry function in which the backrest is partly folded or a cargo (loading) function in which the backrest is fully folded.

SUMMARY

A seat-back motion controller in accordance with the present disclosure is mounted on a passenger and driver seat in a vehicle. The passenger seat includes a seat base and a seat back mounted for pivotable movement relative to the seat base between an upright use position and a fold-flat position.

In illustrative embodiments, the seat-back motion controller includes a motor-drive system including user interface and a motor. The user interface receives user inputs requesting that the seat back be folded down to the fold-flat position or that the seat back be folded out to the upright position. The motor responds to a request to pivot the seat back to the fold-flat position by turning in a forward direction. Conversely, the motor responds to a request to pivot the seat back to the upright position by turning in a rearward direction.

In illustrative embodiments, the seat-back motion controller also includes a seat-back lock and a seat-back positioner including a rotatable base, a first-stage lock mover, and a second-stage seat-back mover. The rotatable base is coupled to the motor-drive system and mounted for rotation about an axis in response to torque applied, for example, by the motor-drive system. The first-stage lock mover and the second-stage seat-back mover are coupled to the rotatable base to rotate therewith. The seat-back lock holds the seat back in the upright position and resists external forces applied to the seat back so that the seat back pivots to the fold-flat position only in response to a user input. The second-stage seat-back mover is configured to provide a lost-motion driving connection between the rotatable base and the seat back. The first-stage lock mover of the seat-back positioner unlocks the seat-back lock before the second-stage seat-back mover of the seat positioner allows transmission of rotational force from the motor-drive system to the seat back so that the seat back does not start to rotate toward the fold-flat position before the seat-back lock is unlocked.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

An illustrative vehicle seat 10 for use in a vehicle 17 in accordance with the present disclosure includes a seat mover 11, a seat base 14, and a seat back 16. Seat mover 11 includes a seat-back motion controller 12 that allows an operator to pivot seat back 16 between an upright position shown in FIG. 1 and a fold-flat position shown in FIG. 2. When seat back 16 is in the upright position, seat back 16 is blocked by a seat-back lock 22 included in seat-back motion controller 12 from pivoting in a fold-down direction toward seat base 14 in response to an external force 15F applied to the back side of seat back 16 as shown in FIG. 3. Force 15F may be produced by cargo, passengers, or other items that might act on seat back 16 in the case of a sudden deceleration of vehicle 17. In the fold-flat position, seat back 16 can be used as a load floor in a vehicle compartment 19 for cargo loaded in vehicle 17 as suggested in FIG. 2.

Figures 7, 7A:
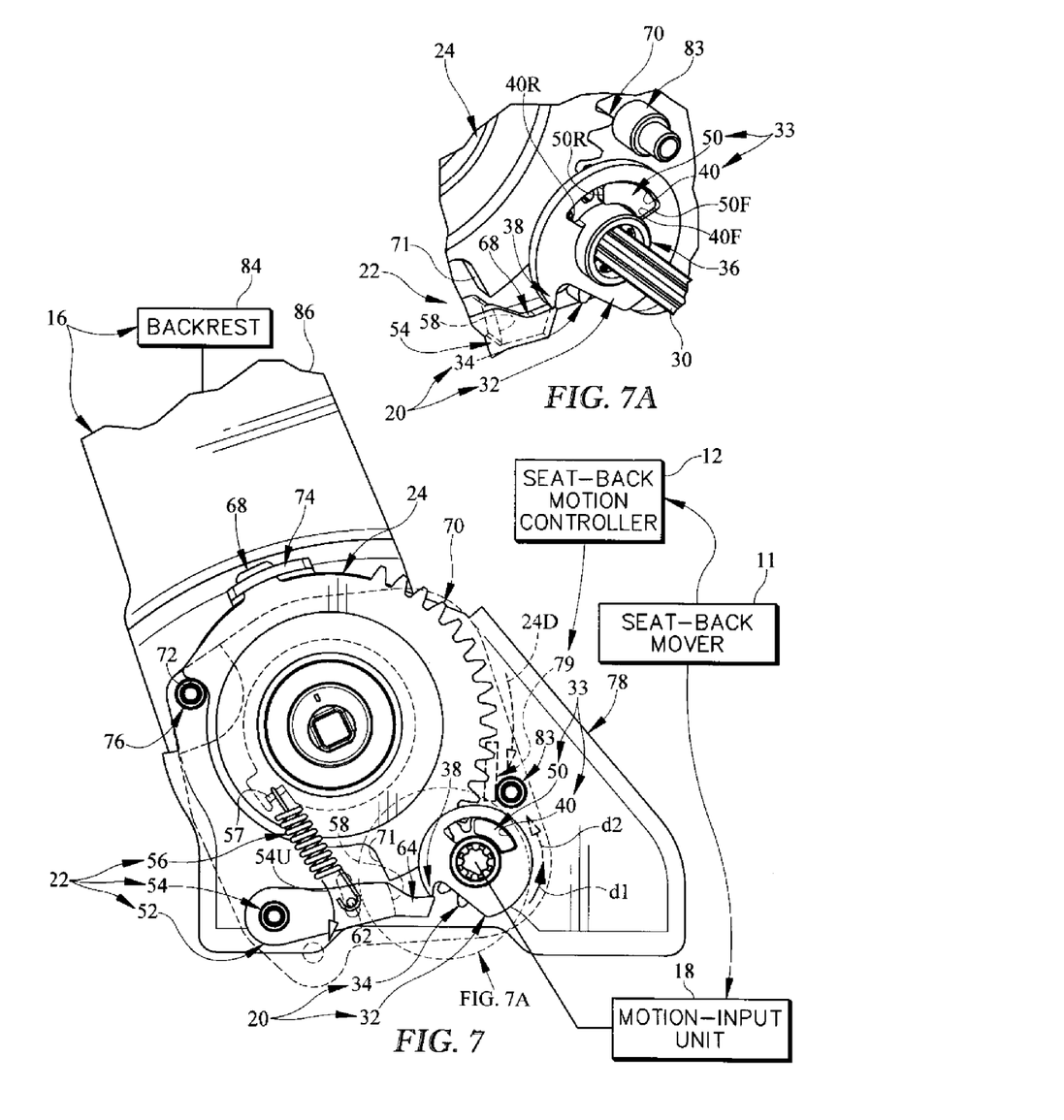
FIG. 7 is a side elevation view of the seat-back motion controller showing the arrangement of the seat back in the upright position and the seat-back lock moved to the unlocked configuration wherein the actuator plate of the actuation device has been rotated a first distance in the forward direction so that the blocker is disengaged from the sector plate while no motion is transferred to the pinion gear or sector plate.
FIG. 7A is a detail perspective view of a portion of the seat-back lock and the seat-back drive showing that a cam-release tooth included in the actuator plate has engaged a release finger included in the blocker so that the sector-locking surface of the blocker (shown in phantom) is disengaged from the sector plate to allow rotational movement of the sector plate before the actuator plate starts transferring motion to the pinion gear and the sector plate.

Seat-back motion controller 12 is configured to lock seat back 16 in the upright position to resist force 15F, to unlock seat back 16 for movement from the upright position, and to drive seat back 16 between the upright position and the fold-flat position. Seat-back motion controller 12, illustratively shown in FIG. 3, seat-back lock 22, a sector plate 24 coupled to seat back 16, and an actuation device 20 transmitting motion from the motion-input unit 18 to the seat-back lock 22 and to the sector plate 24. A motion-input unit 18 included in the seat mover 11 provides rotational drive in a forward direction and in a rearward direction in response to an operator input. Seat-back lock 22 is operable to block rotation of seat back 16 in the fold-down direction when seat back 16 is in the upright position. Sector plate 24 is coupled to seat back 16 so that seat back 16 is rotated in the fold-down direction (toward the fold-flat position) or in a fold-up direction (toward the upright position) as a unit with sector plate 24 in response to a user input. Actuation device 20 receives the rotational drive from motion-input unit 18 and delays movement of seat back 16 from the upright position to the fold-forward position until seat-back lock 22 is moved to an unlocked configuration as shown in FIG. 7.

Figures 5, 5A:
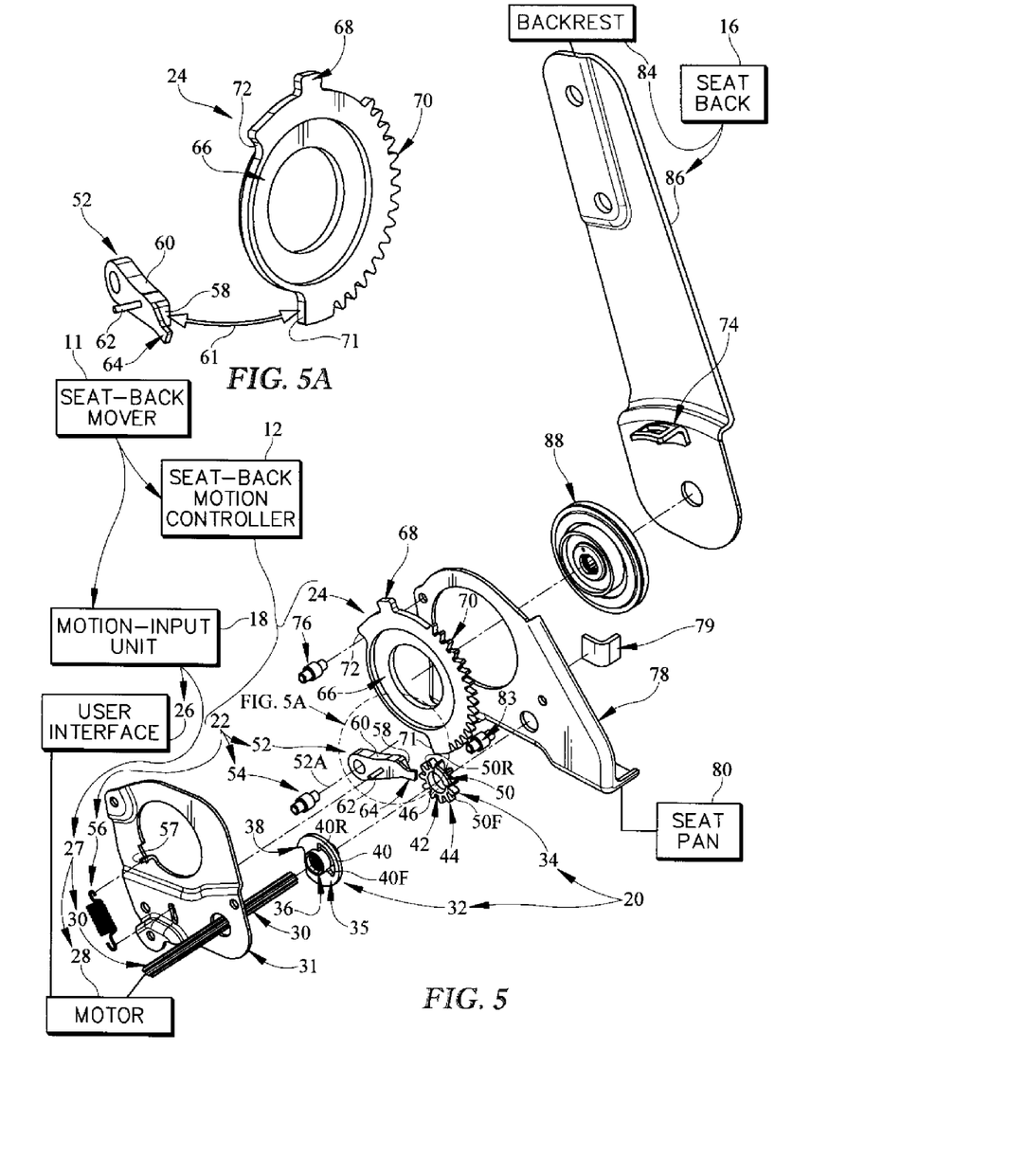
FIG. 5 is an exploded perspective assembly view showing that a motor input shaft is received by the actuator plate of the actuation device and that the pinion gear of the actuation device includes gear teeth configured to mesh with gear teeth included in the sector plate.
FIG. 5A is a detail perspective view of the blocker included in the seat-back lock and the sector plate showing that the blocker includes a sector-locking surface and the sector plate includes a first stop surface configured to engage the sector-locking surface of the blocker as suggested by a curved arrow.

Motion-input unit 18 responds to user inputs requesting that seat back 16 pivot from the upright position to the fold-flat position or vice versa. Motion-input unit 18 illustratively includes a user interface 26, a motor 28, a motor-input shaft 30, and a motor-mount plate 31 as shown in FIG. 5. User interface 26 is operably coupled to motor 28 and directs motor 28 to rotate in a forward or a rearward direction. Motor 28 is illustratively an electric motor providing sufficient torque to move seat back 16 between the upright and fold-flat (or other folded) positions. Motor-input shaft 30 is illustratively driven directly by motor 28 and is splined to prevent unwanted rotation of motor input shaft 30 when received in a corresponding splined hub.

Figure 1:
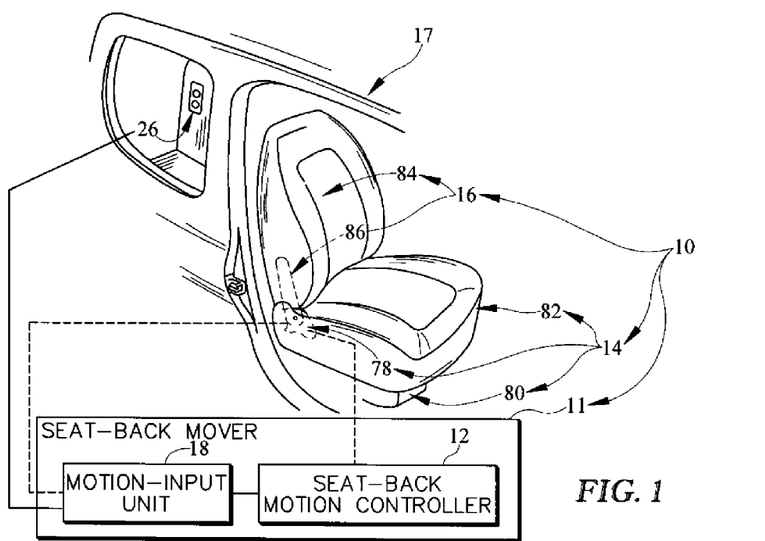
FIG. 1 is a perspective view of a foldable vehicle seat located in an interior compartment of a vehicle and visible through an opened doorway and showing a seat base and a seat back arranged to extend upwardly from the seat base and mounted for pivotable movement about a horizontal pivot axis, and a seat-back motion controller (shown partially in phantom) for pivoting the seat back about a seat-back pivot axis.

User interface 26 is illustratively a pair of buttons electrically wired to motor 28 and mounted at the rear of vehicle 17 to be accessible from outside to a user loading vehicle 17 as shown in FIG. 1. In some embodiments, other user interfaces may be optionally added in other locations, at the top of the backrest for an easy-entry function, for example, in or around the vehicle. In some embodiments, user interface 26 may be wireless and may be a switch, a knob, or another suitable interface for controlling motor 28.

Figures 8, 8A:
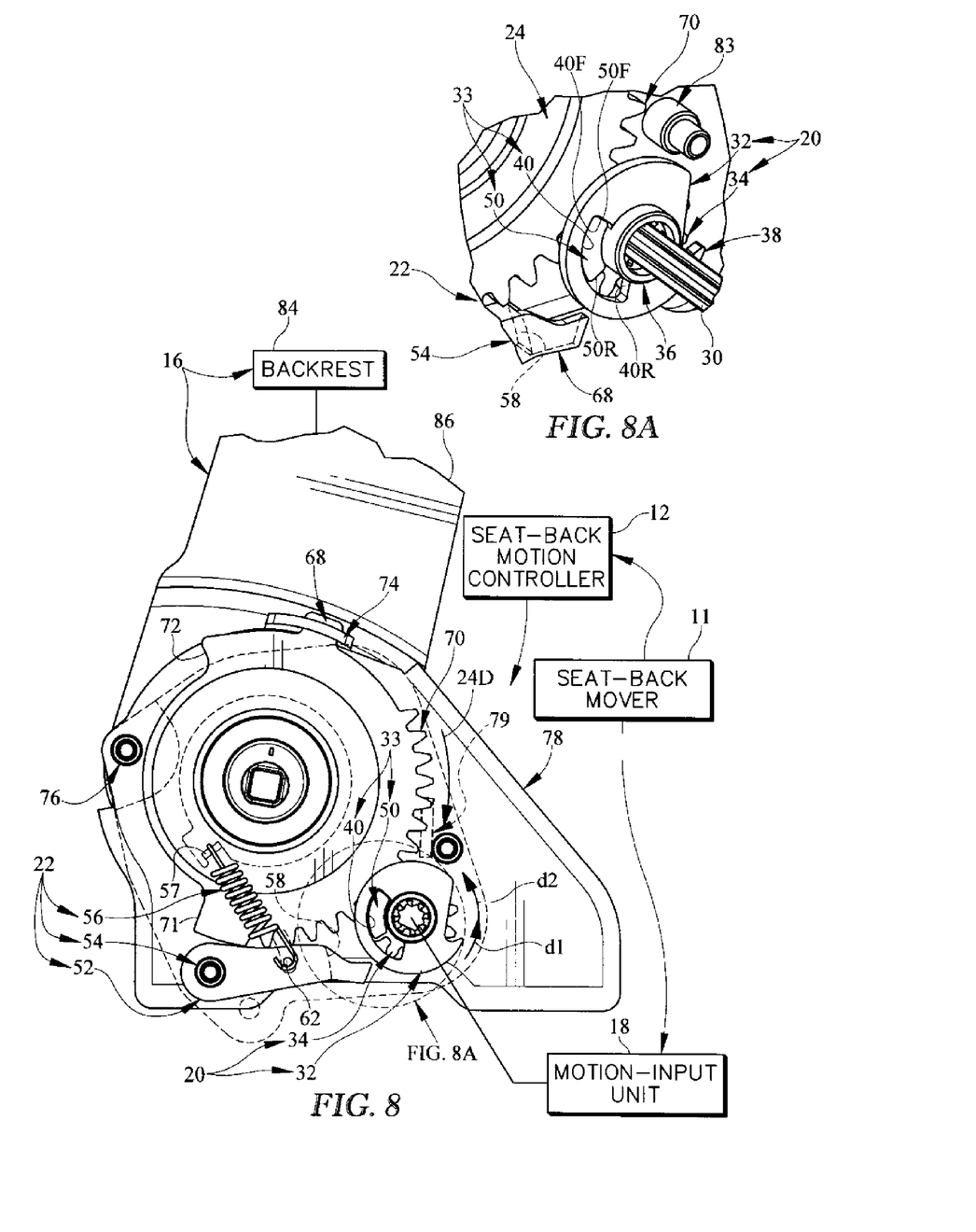
FIG. 8 is a side elevation view of the seat-back motion controller showing the seat back moving from the upright position to the fold-flat position in response to the pinion gear of the actuation device driving the sector plate while the seat-back lock remains in the unlocked configuration.
FIG. 8A is a detail perspective view of a portion of the seat-back motion controller showing that the driven lug coupled to the pinion gear is driven by the drive slot of the actuator plate and the sector-locking surface of the blocker remains disengaged from the sector plate because the gear teeth of the sector plate are sliding along a sector-contact surface formed at the top of the blocker.

Actuation device 20 includes a lost-motion driving connection 33 between motion-input unit 18 and seat back 16 as suggested in FIG. 3. Actuation device 20 illustratively includes an actuator plate 32 and a pinion gear 34 as shown, for example, in FIG. 5. Actuator plate 32 is configured to be rotated by motion-input unit 18 and to move seat-back lock 22 to the unlocked configuration when actuator plate 32 is rotated a first distance d1 in the forward direction as shown in FIG. 7. Pinion gear 34 is configured to be driven through actuator plate 32 in the forward direction after seat-back lock 22 is moved to the unlocked configuration during rotation of actuator plate 32 along a distance d2 as shown in FIG. 8. Pinion gear 34 is also configured to be driven by actuator plate 32 when actuator plate 32 is drive in the rearward direction. Lost-motion driving connection 33 illustratively includes a drive slot 40 formed in actuator plate 32 and a driven lug 50 coupled to pinion gear 34.

Actuator plate 32 illustratively includes a plate body 35, a hub 36, a cam-release tooth 38 and drive slot 40 as shown in FIG. 5. Hub 36 is formed through plate body 35 and is configured to receive motor-input shaft 30. Cam-release tooth 38 extends out from plate body 35 and is configured to move seat-back lock 22 from the locked configuration to the unlocked configuration as suggested in FIG. 7. Drive slot 40 illustratively includes a forward drive surface 40F and a rearward drive surface 40R. In other embodiments, drive surfaces 40F and 40R may be formed by a U-shaped opening extending through plate body 35 or by a pair of lugs extending out from plate body 35 to lie in spaced-apart relation to one another.

Pinion gear 34 includes a gear body 42 and a series of gear teeth 44 coupled to gear body 42 and driven lug 50 is coupled to pinion gear 34 as shown, for example, in FIG. 5. Gear body 42 is formed to include an opening 46 sized to receive hub 36 of actuator plate 32 so that pinion gear 34 can rotate about hub 36. Gear teeth 44 extend radially outward from gear body 42 around gear body 42. Driven lug 50 illustratively extends longitudinally from gear body 42 and includes a forward driven surface 50F and a rearward driven surface 50R. In other embodiments, driven surfaces 50F, 50R may be formed by a pair of lugs extending from gear body 42 and situated in spaced-apart relation to one another. In an alternative embodiment, an actuator plate may include a driver lug and a pinion gear may include a driven slot.

Figures 6, 6A:
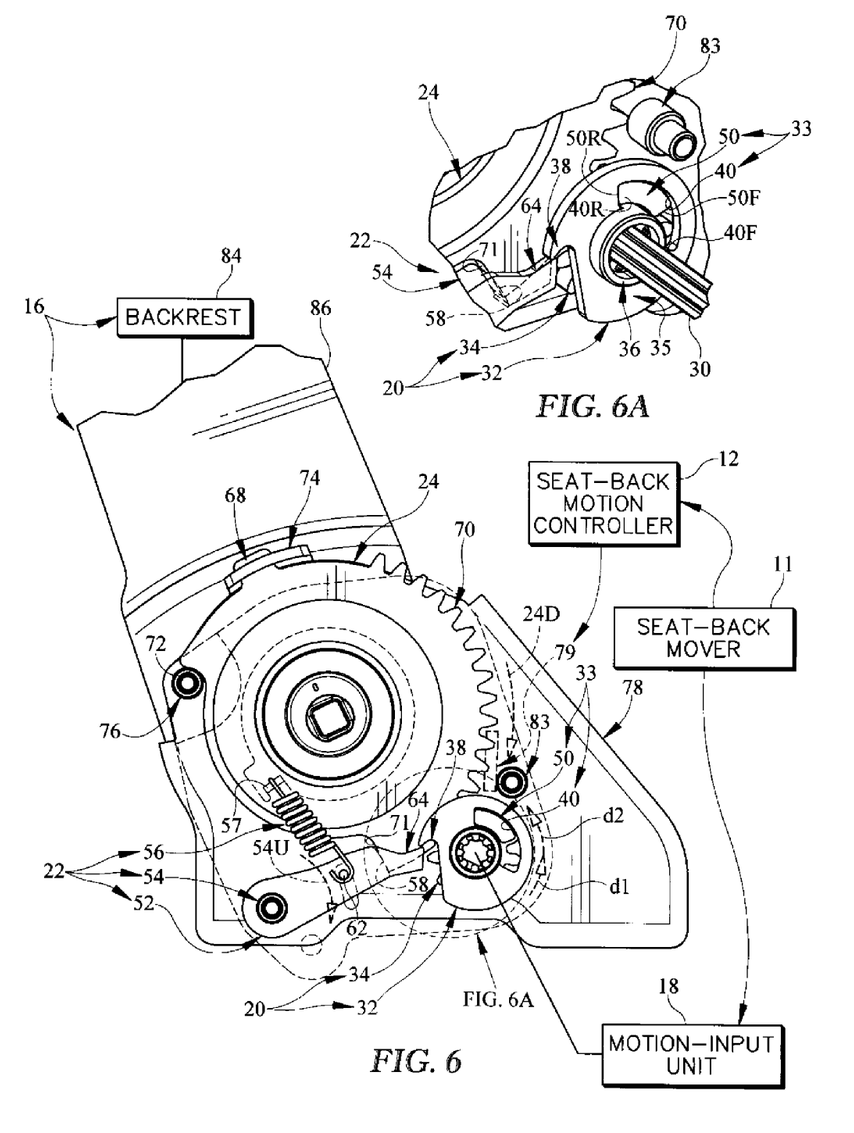
FIG. 6 is a side elevation view of the seat-back motion controller showing the arrangement of the seat back in the upright position and the seat-back lock in the locked configuration wherein the blocker engages the sector plate to block rotational movement of the sector plate and wherein the driven lug coupled to the pinion gear is received in the drive slot of the actuator plate so that rotational movement of the actuator plate will be lost along a first distance when the actuator plate is rotated to disengage the blocker from the sector plate as shown in FIG. 7.
FIG. 6A is a detail perspective view of a portion of the seat-back motion controller showing the seat-back lock in the locked configuration wherein the sector-locking surface of the blocker engages the sector plate to block rotational movement of the sector plate.

Seat-back lock 22 moves between a locked configuration and an unlocked configuration. In the locked configuration, seat-back lock 23 blocks seat back 16 from pivoting in the fold-down direction about a pivot axis from the upright position to the fold-flat position as shown in FIG. 6. In the unlocked configuration, seat-back lock 22 allows seat back 16 to pivot about the pivot axis in the fold-down direction from the upright position to the fold-flat position as shown in FIG. 7. Seat-back lock 22 includes a blocker 52, a cam-pivot post 54, and a cam-return spring 56 as shown, for example, in FIG. 5. Blocker 52 is operable to engage sector plate 24 to block movement of seat back 16 when seat-back lock 22 is in the locked configuration. Cam-pivot post 54 is configured to support blocker 52 for pivotal movement about a cam-pivot axis 54A. Cam-return spring 56 is coupled to a beam 57 extending out from motor mount plate 31 and is configured to bias seat-back lock 22 toward the locked configuration shown in FIG. 6.

Blocker 52 is configured to block sector plate 234 from movement when seat-back lock 22 is in the locked configuration and to allow movement of sector plate 24 when seat-back lock 22 is in the unlocked configuration. Blocker 52 includes a sector-locking surface 58, a sector-running surface 60, a return-spring finger 62, and a cam-release finger 64 as shown in FIG. 5A. Sector-locking surface 58 engages sector plate 24 as suggested by arrow 61 in FIG. 5A. Sector-locking surface 58 blocks sector plate 24 from movement when seat-back lock 22 is in the locked configuration as shown in FIG. 6. Sector-running surface 60 extends along the top of blocker 52 and is contacted by sector plate 24 to hold seat-back lock 22 in the unlocked configuration while seat back 16 is moved between the upright position and the fold-flat position as shown, for example, in FIG. 8. Return-spring finger 62 extends through motor-mount plate 31 and is coupled to cam-return spring 56 so that blocker 52 is biased up toward sector plate 24 and sector-locking surface 58 will block movement of sector plate 24 as shown in FIG. 6. Cam-release finger 64 extends out from sector-locking surface 58 and is engaged by cam-release tooth 38 of actuator plate 32 to move seat-back lock 22 to the unlocked configuration prior to the movement of seat back 16 from the upright position to the fold-flat position as shown in FIG. 7.

Figure 2:
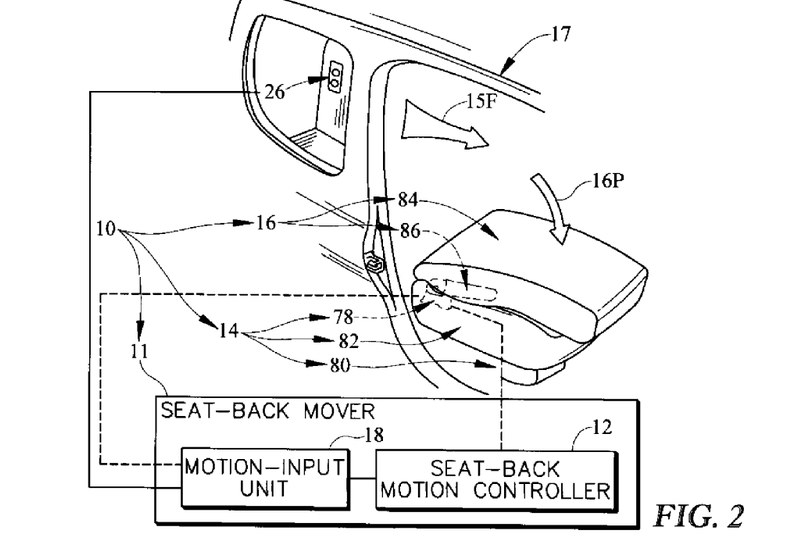
FIG. 2 is a view similar to FIG. 1 showing that a user has operated a user interface mounted in the interior compartment of the vehicle and included in the seat-back motion controller to actuate a motor (also included in the seat-back motion controller) to unlock a seat-back lock, as shown in FIG. 7, and to pivot the seat back about the seat-back pivot axis, as shown in FIG. 8, from an upright use position shown in FIG. 1 to the fold-flat position shown in FIG. 2.
Figure 3:
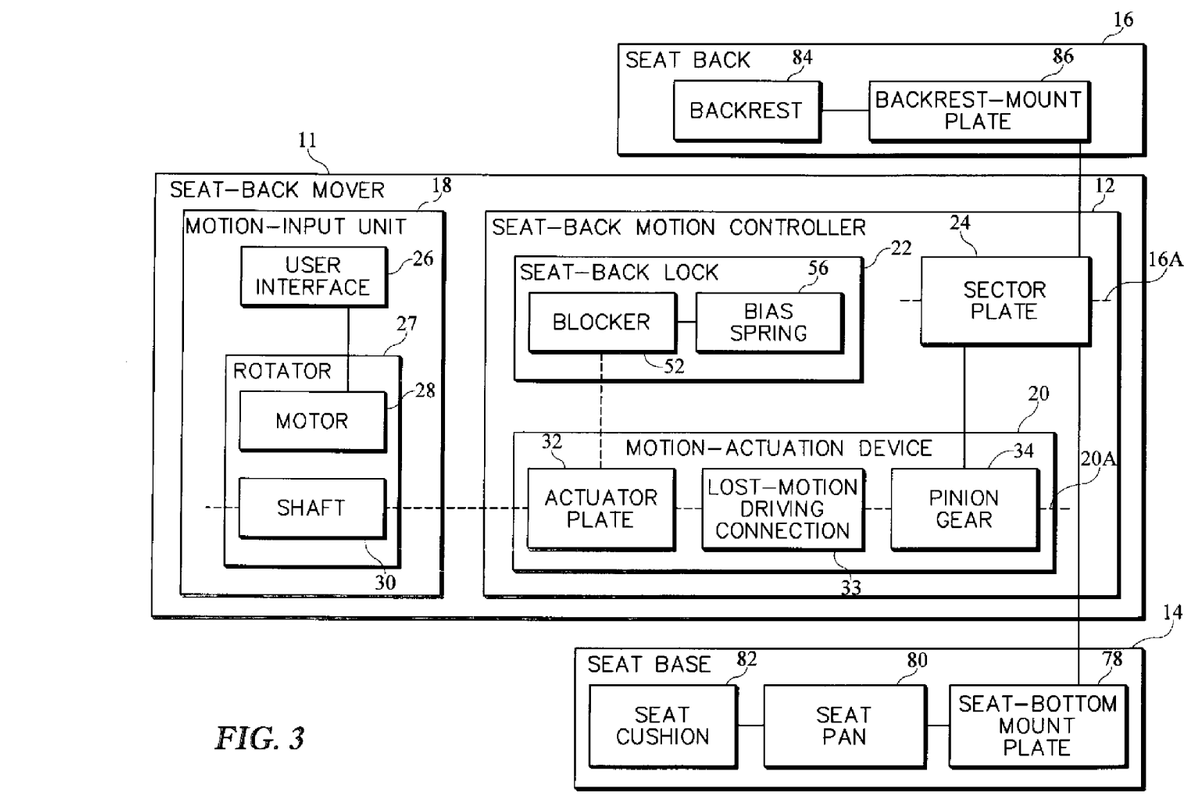
FIG. 3 is a diagrammatic view of the seat-back motion controller of FIGS. 1 and 2 showing the arrangement of a motion transmission device including the actuation plate with drive slot and the pinion gear with driven lug.
Figure 4:
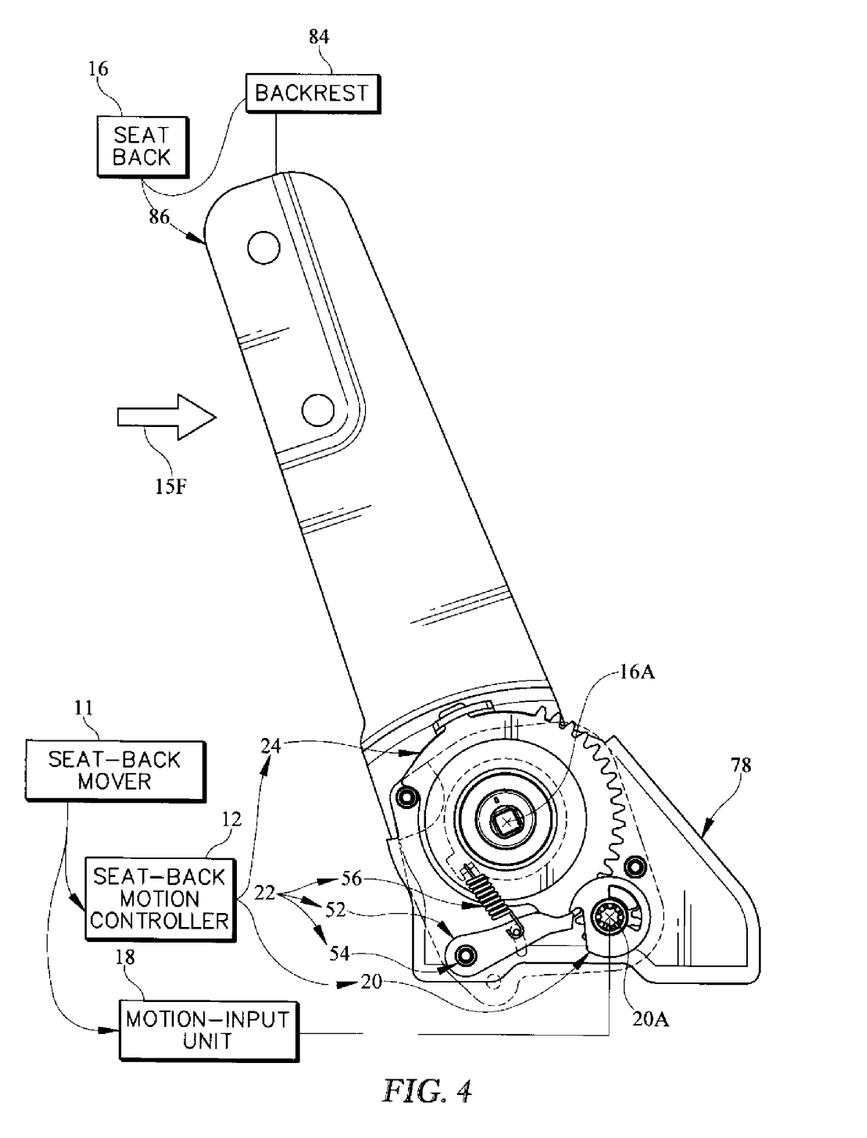
FIG. 4 is a is a side elevation view of the vehicle seat showing that the seat-back motion controller includes an actuation device comprising an actuator plate formed to include a drive slot, a pinion gear with a driven lug, and a lost-motion driving connection, a seat-back lock comprising a blocker and a cam-return spring, and a sector plate driven by the pinion gear of the actuation device and coupled to the seat back.

Sector plate 24 is coupled to seat back 16 and seat back 16 rotates with sector plate 24 as shown in FIG. 2. Sector plate 24 illustratively includes a plate body 66, a mover tab 68, gear teeth 70, a first stop surface 71, and a second stop surface 72 as shown in FIG. 5A. Mover tab 68 is received in a tab-receiving bracket 74 coupled to seat back 16 and mover tab 68 couples seat back 16 to sector plate 24 for rotational movement along with sector plate 24 as shown in FIG. 6. Gear teeth 70 of sector plate 24 mesh with gear teeth 44 of pinion gear 34 so that sector plate 24 is driven along the length of gear teeth 70 by pinion gear 34. First and second stop surfaces 71, 72 of sector plate 24 extend outwardly from plate body 66 and are spaced apart from one another as shown in FIG. 5A.

Figure 9:
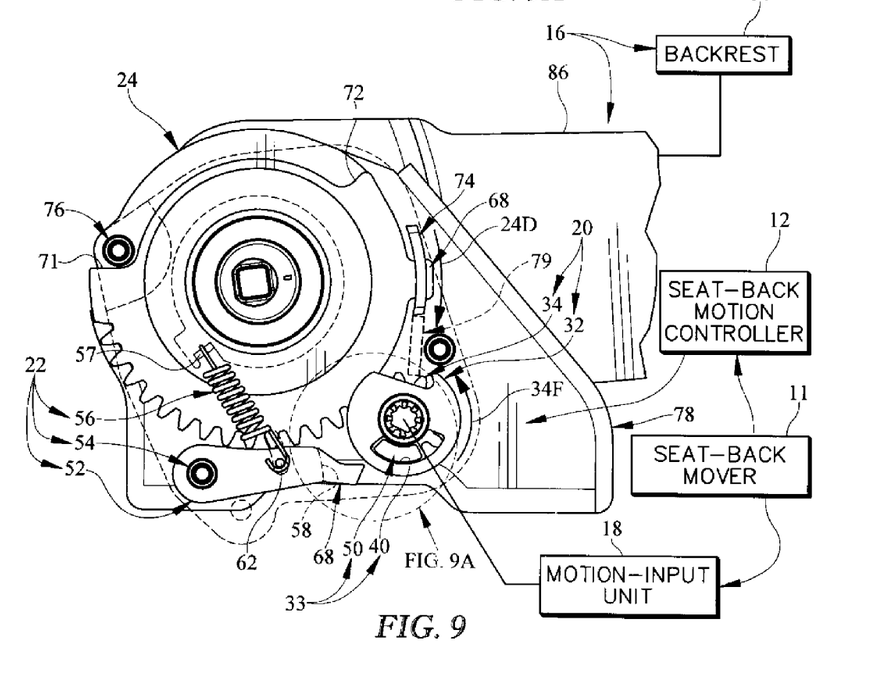
FIG. 9 is a side elevation view of the seat-back motion controller showing the seat back moved to the fold-flat position wherein the sector plate is blocked from further forward rotation by a stop post engaging of the sector plate.
Figure 9A:
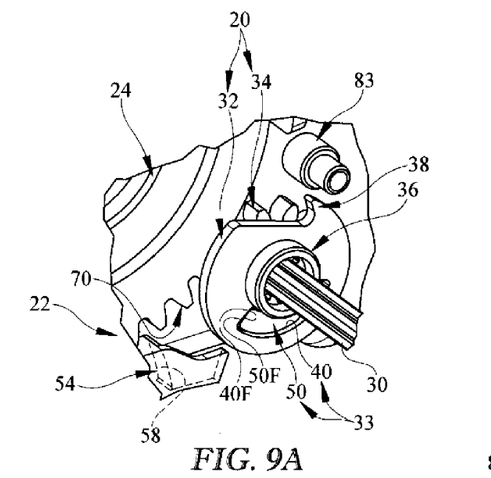
FIG. 9A is a detail perspective view of a portion of the seat-back motion controller showing that further rotation of the actuation device in the forward direction will not cause further rotation of the sector plate because the gear teeth of the sector plate have terminated and the pinion gear has driven the last of the sector teeth included in the sector plate so that additional rotational motion in the forward direction of the pinion gear will not drive the sector plate and the seat back.

First and second stop surfaces 71, 72 of sector plate 24 are configured to block over-rotation of sector plate 24 and seat back 16 as shown in FIG. 6 and FIG. 9. When seat back 16 is in the upright position and seat-back lock 22 is in the locked configuration, sector plate 24 is blocked from rotation in either direction. To block sector plate 24 from rotation in either direction, first stop surface 71 is engaged by sector-locking surface 58 of blocker 52 and second stop surface 72 is engaged by a stop post 76 coupled to a seat-bottom mount plate 78 as shown in FIG. 6. When seat back 16 is pivoted to the fold-flat position, sector plate 24 is blocked from further forward rotation. To block sector plate 24 from rotation in the forward direction, first stop surface 71 contacts stop post 76. Tab-receiving bracket 74 of seat back 16 engages a seat-bottom stop bracket 79 coupled to seat bottom mount plate 78 as shown in FIG. 9.

Seat base 14 underlies seat back 16 and includes seat bottom mount plate 78, a seat pan 80, and a seat cushion 82 as shown, for example, in FIG. 1. Seat-bottom mount plate 78 is coupled to seat pan 80 and supports seat-back motion controller 12. Seat-bottom mount plate 78 supports motor-mount plate 31 and is coupled to motor-mount plate 31 by cam-pivot post 54, stop post 76, and a connector post 83 that extend therebetween as shown in FIG. 5. Seat pan 80 is coupled to vehicle 17. Seat cushion 82 is configured to support a user and is coupled to seat pan 80.

Seat back 16 includes tab-receiving bracket 74, a backrest 84, and a backrest-mount plate 86. Tab-receiving bracket 74 receives mover tab 68 of sector plate 24 so the at sector plate 24 drives rotation of seat back 16. Backrest 84 is configured to support a user and is coupled to backrest-mount plate 86. Backrest-mount plate 86 is pivotably coupled to seat-bottom mount plate 78 of seat base 14 as shown illustratively in FIG. 5.

Vehicle seat 10 also includes a seat-back recline system 88 coupled to seat back 16 as shown in FIG. 5. Seat-back recline system 88 is operable to allow seat back 16 to move from the upright position shown in FIG. 1 to a recline position (not shown). Seat-back recline system 88 is illustratively a powered system. In other embodiments, seat-back recline system 88 may be a non-powered system.

To pivot seat back 16 from the upright position to the fold-flat position as suggested by arrow 16P in FIG. 2, a user activates user interface 26 so that motor 28 rotates in the forward direction (as indicated by distance d1 and d2 arrows shown in FIG. 8). Actuator plate 32 is driven by motor 28 first distance d1 along lost-motion angle α without imparting any rotation from motor 28 to pinion gear 34 as shown in FIG. 7. When actuator plate 32 moves distance d1, cam-release tooth 38 engages cam-release finger 64 of blocker 52 so that seat-back lock 22 is moved to the unlocked configuration in a first stage of operation during rotation of shaft 230 in a first direction as suggested by arrow 54U. Continued rotation of actuator plate 32 causes forward drive surface 40F of drive slot 40 to engage forward driven surface 50F of driven lug 50 so that pinion gear 34 begins to turn with actuator plate 32 as shown in FIG. 8. As pinion gear 34 turns in the forward direction suggested by arrow 34F, gear teeth 44 of pinion gear 34 mesh with gear teeth 70 of sector plate 24 so that sector plate 24 is rotated in the fold-down direction in a second stage of operation during continued rotation of shaft 230 in the first direction as suggested by arrow 24D so that seat back 16 is moved away from the upright position and toward the fold-flat position as shown in FIG. 8. As seat back 16 is moved from the upright position to the fold-flat position, sector plate 24 maintains seat-back lock 22 in the unlocked configuration by contacting the sector running surface 60 of blocker 52 as shown in FIG. 8. When seat back 16 reaches the fold-flat position, pinion gear 34 has driven each of the gear teeth 70 of sector plate 24 past pinion gear 34 and sector plate 24 is blocked from further rotation in the forward direction by stop post 76 as shown, for example, in FIG. 9.

To move seat back 16 from the fold-flat position to the upright position, a user activates user interface 26 so that motor 28 rotates in the rearward direction. Actuator plate 32 is driven by motor 28 without imparting any rotation from motor 28 until rearward drive surface 40R of drive slot 40 engages rearward driven surface 50R of driven lug 50 so that pinion gear 34 begins to turn with actuator plate 32. As pinion gear 34 turns in the rearward direction, gear teeth 44 of pinion gear 34 mesh with gear teeth 70 of sector plate 24 so that sector plate 24 is rotated in the fold-out direction so that seat back 16 is moved away from the fold-flat position and toward the upright position. As seat back 16 is moved from the fold-flat position to the upright position, sector plate 24 maintains seat-back lock 22 in the unlocked configuration by contacting the sector running surface 60 of blocker 52. When seat back 16 reaches the upright position, cam-return spring 56 pulls blocker 52 up so that sector-locking surface 58 of blocker 52 engages first stop surface 71 of sector plate 24 blocking sector plate 24 from fold-down rotation. Sector plate 24 is blocked from further rotation I the rearward direction by stop post 76 engaging second stop surface 72 of sector plate 24 as shown, for example, in FIG. 6.

In illustrative embodiments, the seat back includes a pivotable backrest and a sector plate coupled to the pivotable backrest to pivot therewith about a seat-back pivot axis. A seat-back lock is movable between a locked position blocking rotation of the sector plate about the seat-back pivot axis and an unlocked position freeing the sector plate to rotate about the seat-back pivot axis. A seat-back positioner includes a rotatable base configured to be rotated about an axis in response to a torque applied by a motor-drive system (or manually), a first-stage lock mover, and a second stage seat-back mover. The first-stage lock mover is coupled to the rotatable base to rotate therewith and is configured to provide means for moving the seat-back lock from the locked position to the unlocked position without moving the sector plate about the seat-back pivot axis to rotation of the rotatable base in a first direction. The second-stage seat-back mover is also coupled to the rotatable base to rotate therewith and is configured to provide means for pivoting the sector plate about the seat-back pivot axis in response to continued rotation of the rotatable base in the first direction so that the pivotable backrest is pivoted about the seat-back pivot axis.

The invention claimed is:

1. A vehicle seat comprising a seat base, a seat back coupled to the seat base for movement about a seat-back pivot axis from a locked upright position to a fold-flat position, and a seat mover configured to unlock the seat back while the seat back lies in the locked upright position and then move the seat back toward the fold flat position, wherein the seat mover includes a seat-back motion controller including a sector plate mounted for movement about the seat-back pivot axis and coupled to the seat back such that the seat back moves with the sector plate about the seat-back pivot axis, a seat-back lock including a blocker movable from a first position blocking the sector plate from movement about the seat-back pivot axis to a second position freeing the sector plate for movement about the seat-back pivot axis and a spring biasing the blocker toward the first position, and an actuation device for moving the blocker against the force of the spring from the first position to the second position before transmitting rotational drive motion provided by a motion-input unit to the sector plate so that the sector plate and the seat back are free to pivot as a unit about the seat-back pivot axis before the sector plate and the seat back are moved together by the motion-input unit about the seat-back pivot axis from an unlocked upright position to the fold-flat position, wherein the actuation device includes an actuator plate mounted for rotation about a drive axis extending parallel to the seat-back pivot axis to push the blocker from the first position to the second position and a pinion gear mounted for rotation about the drive axis to drive the sector plate about the seat-back pivot axis so that the seat back moves from the upright position to the fold-forward position, and wherein the pinion gear includes a gear body mounted for rotation about the drive axis and gear teeth extending outwardly in a radial direction from the gear body to mesh with gear teeth formed in the sector plate so that rotation of the pinion gear causes rotation of the sector plate and the seat back about the seat-back pivot axis.

2. The vehicle seat of claim 1, wherein the actuator plate includes a plate body mounted for rotation about the drive axis and a blocker-release tooth extending away from the plate body toward the blocker to contact a blocker-release finger included in the blocker to move the blocker about a blocker-pivot axis from the first position to the second position when the actuator plate is rotated about the drive axis.

3. The vehicle seat of claim 2, wherein the pinion gear includes a gear body mounted for rotation about the drive axis and gear teeth extending outwardly in a radial direction from the gear body to mesh with gear teeth formed in the sector plate so that rotation of the pinion gear causes rotation of the sector plate and the seat back about the seat-back pivot axis.

4. The vehicle seat of claim 1, wherein the actuation device includes a lost-motion driving connection coupled to the actuator plate and to the pinion gear.

5. The vehicle seat of claim 3, wherein the actuation device includes a lost-motion driving connection coupled to the actuator plate and to the pinion gear.

6. The vehicle seat of claim 5, wherein the blocker-release tooth, the blocker-release finger, and the lost-motion driving connection are located in a first common vertical plane.

7. The vehicle seat of claim 4, wherein the actuation device includes an actuator plate mounted for rotation about a drive axis extending parallel to the seat-back pivot axis and a pinion gear mounted for rotation about the drive axis.

8. The vehicle seat of claim 7, wherein the lost-motion driving connection includes a lug coupled to the pinion gear and a slot formed in the actuator plate to receive the lug such that the actuator plate is directly rotatable by the motion-input unit to establish a first mechanical drive path from the motion input unit to the blocker and the pinion gear is indirectly rotatable by the motion-input unit after the actuator plate has traveled a first distance to establish a second mechanical drive path from the motion input unit to the sector plate.

9. The vehicle seat of claim 8, wherein the slot and the lug are arcuate and extend along a common radius centered on the drive axis.

10. The vehicle seat of claim 8, wherein the actuator plate includes a plate body mounted for rotation about the drive axis and a blocker-release tooth extending away from the plate body toward the blocker to contact the blocker to move the blocker about a blocker-pivot axis from the first position to the second position when the actuator plate is rotated about the drive axis.

11. The vehicle seat of claim 1 wherein the sector plate includes a first stop surface that contacts a sector-locking surface of the blocker when the seat back is in the upright position and the blocker is in the first position such that the sector plate is blocked from pivoting in a fold-down direction about the seat-back pivot axis and wherein the sector plate contacts a sector-running surface of the blocker when the seat back is between the upright position and the fold-flat position holding the blocker in the unlocked position while the seat back is between the upright position and the fold flat position.

12. The vehicle seat of claim 11, wherein the pinion gear, the first stop surface of the sector plate, and the sector-locking surface of the blocker are located in a second common vertical plane.

13. The vehicle seat of claim 11, wherein the first stop surface of the sector plate contacts a stop post included in the seat base when the seat back is in the fold-forward position blocking the seat back from movement in the fold-down direction past the fold-forward position.

14. The vehicle seat of claim 13, wherein the sector plate includes a second stop surface, spaced radially apart from the first stop surface, that contacts the stop post when the seat back is in the upright position blocking movement of the seat back in the fold-up direction past the upright position.

15. The vehicle seat of claim 14, wherein the gear teeth formed in the sector plate are located radially between the first stop surface and the second stop surface in the second common vertical plane.

16. The vehicle seat of claim 1, wherein the seat base includes a seat-bottom-mount plate adapted to be coupled to a floor of a vehicle, the seat back is mounted to a first side of the seat-bottom-mount plate, and the seat-back mover is mounted to a second side, facing away from the first side, of the seat-bottom-mount plate.

* * * * *